Figure 1:
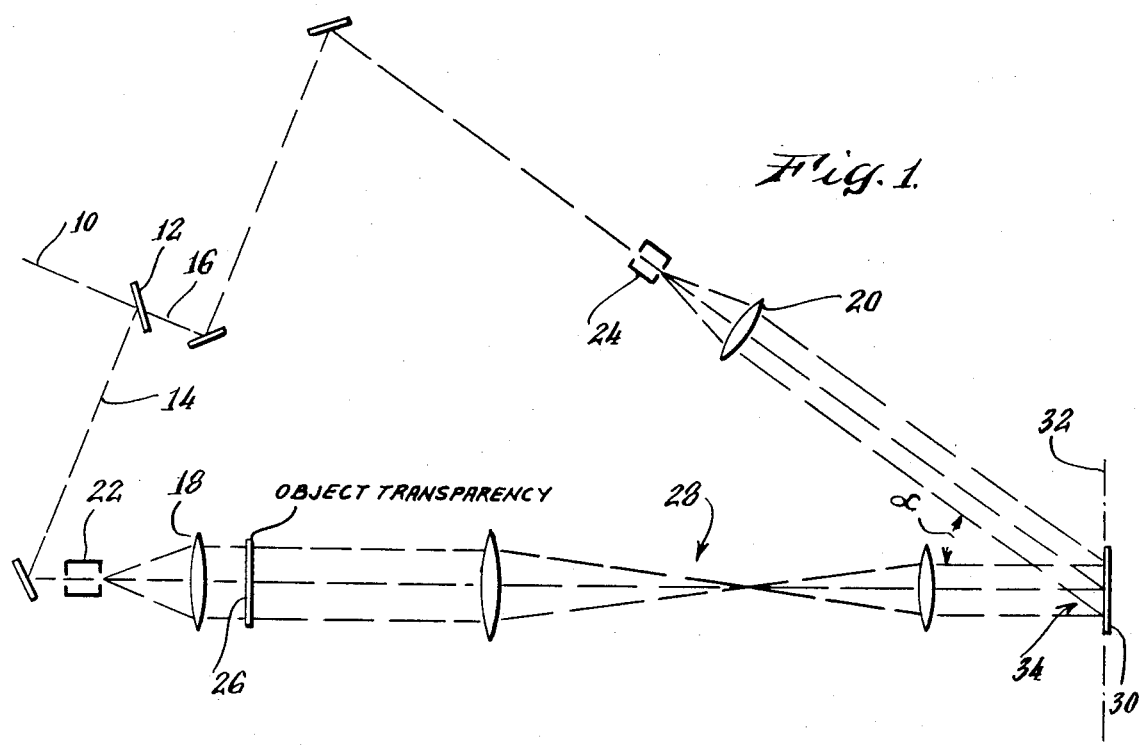

United States Patent
Carlsen

[11] 3,813,139
[45] May 28, 1974

[54] IMAGE-PLANE CARRIER HOLOGRAM RECORDING SYSTEM USING SPHERICAL WAVEFRONTS

[75] Inventor: W. John Carlsen, New York, N.Y.

[73] Assignee: General Telephone & Electronics Laboratories Incorporated, New York, N.Y.

[22] Filed: May 1, 1972

[21] Appl. No.: 248,956

[52] U.S. Cl. ................................. 350/3.5
[51] Int. Cl. ............................. G02b 27/00
[58] Field of Search ....................... 350/3.5

[56] References Cited
UNITED STATES PATENTS
3,659,914   5/1972   Brooks................................. 350/3.5
3,695,744   10/1972  Clay..................................... 350/3.5

Primary Examiner—Ronald J. Stern
Attorney, Agent, or Firm—Irving M. Kriegsman

[57] ABSTRACT

An image-plane carrier hologram recording apparatus utilizing coherent object and reference light beams having spherical wavefronts is described. In one embodiment, a pair of lenses is employed. One of the lenses images the object beam on a recording plane for interference with the spherical wavefront of the reference beam. The other lens focuses the object beam into a small point of divergence in a plane which also includes the point of divergence of the reference beam to effect cancellation of spherical components at the recording plane. In another embodiment a single lens image-plane hologram recording apparatus is described.

1 Claim, 3 Drawing Figures

PATENTED MAY 28 1974 3,813,139

IMAGE-PLANE CARRIER HOLOGRAM RECORDING SYSTEM USING SPHERICAL WAVEFRONTS

BACKGROUND AND SUMMARY OF THE INVENTION

This invention relates to a method and apparatus for recording holographic images. More specifically, this invention relates to an improved method for recording image-plane carrier holograms.

In a co-pending patent application Ser. No. 249,324 entitled "Method and Apparatus for Producing and Displaying Holographic Images" filed on the same date with this invention by W. John Carlsen and assigned to the same assignee, a technique is described for making image-plane carrier holograms and projecting these with generally collimated white light projectors.

As described in this co-pending patent application, an object to be recorded is illuminated with a collimated beam of coherent light, such as from a laser to form a spatially modulated object beam. The object beam is imaged on a recording plane with parallel rays and brought into interference with collimated reference beam which is coherent with the object beam. The result is an image-plane hologram which has a discrete spatial carrier frequency in correspondence with the color employed in the object and reference beams. A color-encoded hologram may be formed with superimposed spatial carrier frequencies, each of which is constant and corresponds to a color in the beams. A particular advantage in the use of image-plane holograms formed with discrete constant spatial carrier frequency for each color lies in the simplicity of the projectors needed to reconstruct and display the image. Other advantages such as color-encoding of the holograms and facilitation of the replication of recorded holograms are more fully described in the identified co-pending patent application.

In an improved recording system for producing holographic recordings of an object in accordance with the invention, the object and reference beams, instead of being collimated, may be in the form of spherical wavefronts such as obtained from pinholes in a spatial filter. Despite the fact that the recording wavefronts, i.e. the object and reference beams, are not collimated, the processed image-plane holograms may still be displayed in projectors such as described in the previously identified co-pending patent application.

The improved recording apparatus provides distinct advantages in that it utilizes fewer lenses, is more compact and reduces the chances for stray noise on the image plane and permits the use of low minimum distortion small aperture lenses to focus the image.

FIG. 1 shows an optical arrangement of an image-plane hologram recording apparatus such as is generally described in the co-pending patent application. A coherent collimated light source such as a laser beam 10 is applied to a beam splitter 12 to form an object beam 14 and a reference beam 16. Both beams 14 and 16 are collimated respectively by lenses 18 and 20 after having been passed through pinhole spatial filters 22 and 24. The object beam is directed through the transparency object 26 and subsequently is focused by a telecentric relay 28 on a holographic recording film 30 located in a recording plane 32. The telecentric relay produces a parallel ray image 34 in plane 32. The collimated reference beam 16 is directed at film 30 with a recording angle α relative to the parallel rays of the object beam at plane 32 to form the image plane hologram on film 30. The image-plane hologram formed on film 30 has a spatial frequency carrier distribution of a constant discrete value across the entire area of the holographic recording film 30.

An image recording system which uses coherent light illumination such as from a laser, is highly susceptible to the recording of stray interference pattern which are superimposed over the image-plane hologram and are caused by dust particles, chips, scratches, fingerprints, etc. on any of the optical elements. In an image-plane holographic recording system in accordance with the invention the number of lenses is reduced to two with at least one of them being almost negligible susceptible to such undesirable stray interference effects.

Furthermore, since only a small area of the other lens is employed, an optimum central lens region, which is free of stray interference influence, can be selected in the recording of the holographic image. Hence, less rigid aberration correction capability is required of the lens.

Another advantage of the improved holographic recording apparatus in accordance with the invention resides in the ability to establish any desired range of magnifications or demagnifications by position adjustments and without requiring lens changes.

Figure 2:
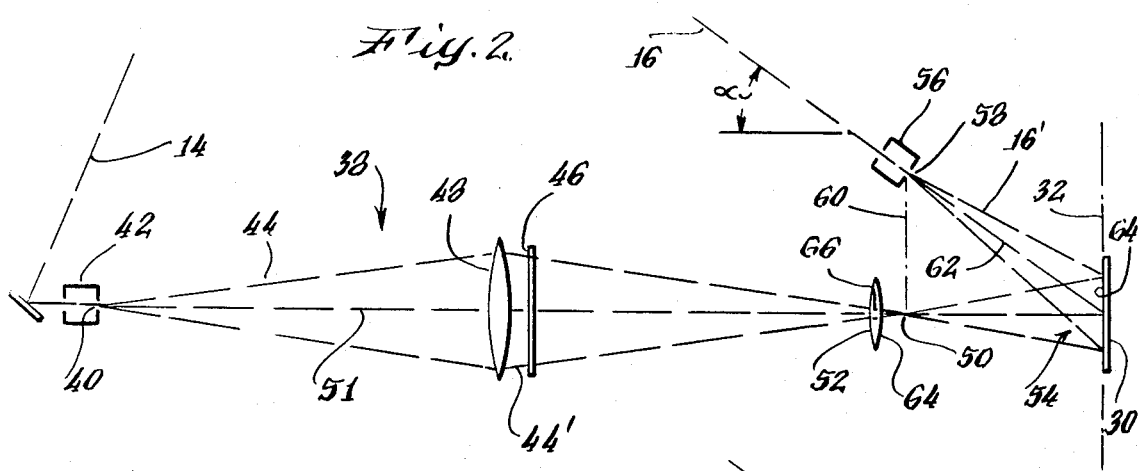
Figure 3:
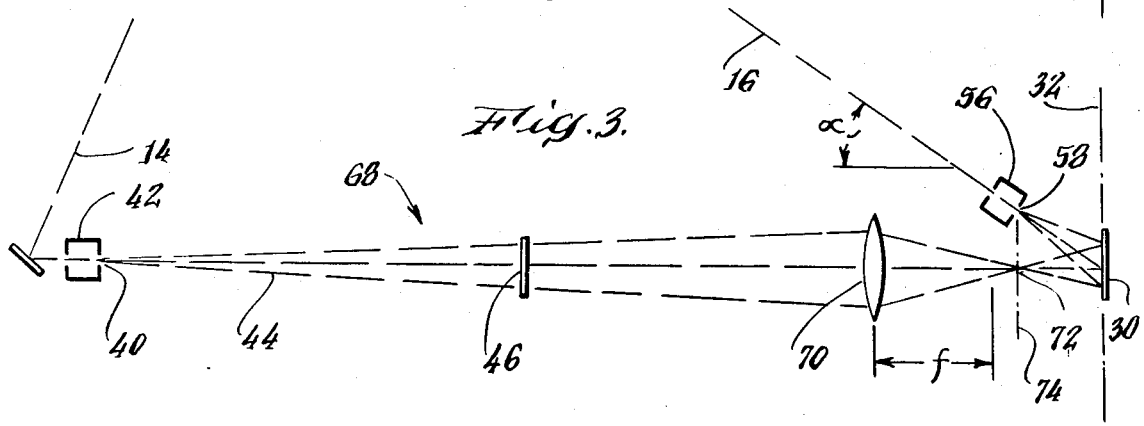

These and other advantages of the improved image-plane holographic recording apparatus in accordance with the invention will be understood from the following detailed description of several embodiments in conjunction with the drawings wherein FIG. 1 is a schematic representation of a hologram recording apparatus described in the previously identified co-pending patent application;

FIG. 2 is a schematic representation of an improved image-plane hologram recording apparatus in accordance with the invention; and FIG. 3 is a schematic representation of an alternate embodiment for an improved image-plane hologram recording apparatus in accordance with the invention.

With reference to FIG. 2, a recording apparatus 38 in accordance with the invention is shown. An object beam 14 such as derived from a laser is passed through a pinhole 40 in a spatial filter 42. The light beam 44 emanating from pinhole 40 has a spherical wavefront and, after passage through transparency object 46, is focused by a lens 48 to an object beam focal spot 50 on optical axis 51 in the vicinity of a lens 52. Lens 52 focuses the object beam 44 to an image 54 at the film plane 32. The distance from object 46 and image 54 to lens 52 are determined by conventional imaging considerations such as desired magnification or demagnification and the like. Lens 48 is so positioned that its resulting converging beam 44' illuminates the entire object transparency 46.

The distance between object beam focal point 50 and the recording plane 32 is selected about 10 or more times the width of image 54. The diameter and focal length of lens 48, as well as other relevant distances between the optical components, are determined on the basis of desired magnification or demagnification using optical design techniques which are well-known to one knowledgable in optics. In the embodiment shown in FIG. 2, by virtue of object beam focal spot 50, the object beam 44 arrives at film plane 32 as an essentially spherical wavefront which has been spatially modulated by the focused image distribution.

Reference beam 16 is passed through a second pinhole spatial filter 56 to produce a spherical wavefront reference beam 16'. Other optical arrangements than pinhole filter 56 may be employed to form a spherical wavefront reference beam 16'. The center of divergence of reference beam 16', i.e. pinhole 58, is located at the same distance from film plane 32, as measured along a line normal to plane 32, as the center of divergence, i.e. object beam focal spot 50, of the spherical object wavefront. Hence, pinhold 58 and object beam focal spot 50 are located in a common focal plane 60 which is parallel with recording plane 32.

The recording angle α, i.e. the angle formed between optical axis 51 and the radial 62 which connects pinhole 58 with the intersection 64 of optical axis 51 and plane 32 is the same angle selected for reference beam 16 in FIG. 1.

With the optical elements arranged as described with reference to FIG. 2, an optimum degree of cancellation of spherical components of the object beam and reference beam wavefronts is obtained at the recording plane 32. The resulting interference pattern is an image-plane hologram and nearly the same as if beams 44' and 16' were plane wavefronts. The degree to which this cancellation occurs is proportional to the distance between the beam divergence points 50 and 58 in focal plane 60 and the recording plane 32. In practice, when this distance is approximately ten or more times the width of image 54, the resulting image-plane hologram is substantially indistinguishable from a hologram made with plane waves as described with reference to FIG. 1. The resulting hologram may be viewed in the same projector as described in the previously identified co-pending patent application.

The described holographic recording apparatus of FIG. 2 easily accommodates magnification changes of image 54 on recording film 30. Both lens 52 and film 30 may be moved to new positions as determined by conventional imaging techniques. If the distance between lens 52 and film plane 32 is altered to obtain a change in the image size, then lens 48 is also moved to again bring object beam 44 to a new object beam focal spot 50' near the center of lens 52. In such case, the divergence point 58 of reference beam 16 is also moved to maintain pinhole 58 in the same plane 60 as that of the new object beam focal spot 50'.

The relative insensitivity of the recording apparatus 38 to lens defects of lens 48 or dust particles and the like is obtained by locating lens 48 quite close to object transparency 46. Any light which is scattered from defects in lens 48 may be nearly focused on film 30 rather than diverging to form large annoying defraction patterns on the film. The diameter of lens 48 is furthermore selected to assure uniform illumination of object transparency 46 as well as to accommodate a desired range of magnification.

Positioning of the object beam focal spot 50 of object beam 44 is not critical. Preferrably object beam focal spot 50 is placed generally about one-half inch from the back lens surface 64. In this manner, the portion of object beam 44 passing through lens 52 will be of sufficiently large diameter to decrease recording sensitivity to defects in lens 52 while still being sufficiently small to utilize a small high quality central portion 66 of lens 52. Hence, relatively inexpensive lenses 48 and 52 may be used.

An alternative image-plane hologram recording apparatus 68 utilizing spherical wavefronts is shown in FIG. 3. In apparatus 68 a single lens 70 may be employed. The object beam 44 with a spherical wavefront is first passed through object transparency 46 and then focused by lens 70 to an image 54 on recording film 30 after passing through an object beam focal spot 72. The reference point source 58 for reference beam 16 is again located in a common plane 74 with the object focal point 72.

Apparatus 68 is less complicated to make and easier to adjust for different magnifications. However, lens 70 must be substantially free from dust and defects and well-corrected for aberrations since the outer part of the image is focused primarily by outer parts of lens 70. Apparatus 68 is less compact then apparatus 38 of FIG. 2 since lens 70 must have about twice the focal length of lens 52 to keep the object beam focal spot 72 of the object beam sufficiently far enough from film 30 to achieve the previously described cancellation of spherical components. Point source 40 for object beam 44 must also be farther from object transparency 46 to provide its complete illumination. The utility of apparatus 68 is particularly attractive when frequent magnification changes are needed or different film format sizes must be accommodated.

Having thus described the improved image-plane hologram recording apparatus in accordance with the invention, its many advantages can be appreciated. The image-plane hologram recorder of this invention provides constant, discrete spatial carriers over the entire area of the hologram plane by causing spherical components to be cancelled. The lenses are less expensive to make and easier to adjust to accommodate magnification changes and different film sizes.

What is claimed is:

1. An apparatus for forming an image plane hologram of an object in a recording plane comprising:
   a. means for illuminating the object with a diverging spherical wavefront of coherent light,
   b. lens means positioned behind the object for collecting the diverging light emerging from the object and forming an image of the object on the recording plane after the light has passed through an object beam focal spot, and
   c. means for producing a reference diverging spherical wavefront of light that is coherent with the light illuminating the object,
   d. said reference wavefront producing means and the lens means being selectively located relative to each other and relative to the recording plane such that both wavefronts illuminate the same area of the recording plane and diverge from a plane parallel to the recording plane and form an image-plane hologram of the object in the recording plane with an amplitude modulated interference pattern of a substantially constant space carrier frequency.

* * * * *